United States Patent [19]

Chau

[11] Patent Number: 5,589,717
[45] Date of Patent: Dec. 31, 1996

[54] COMPACT SPECTRUM ANALYZER MODULE

[75] Inventor: Chiu Chau, Woodbridge, N.J.

[73] Assignee: Instruments SA, Inc., Edison, N.J.

[21] Appl. No.: 527,290

[22] Filed: Sep. 12, 1995

Related U.S. Application Data

[63] Continuation of Ser. No. 2,597, Jan. 11, 1993, abandoned.

[51] Int. Cl.$^6$ .................................................. G01J 3/28
[52] U.S. Cl. ............................................................ 356/328
[58] Field of Search ................................... 356/326, 328, 356/334

[56] References Cited

U.S. PATENT DOCUMENTS

| | | | |
|---|---|---|---|
| 4,068,954 | 1/1978 | Da Silva | 356/334 |
| 4,285,596 | 8/1981 | Landa | 356/328 |
| 4,455,088 | 6/1984 | Koike | 356/334 |
| 4,850,706 | 7/1989 | Mikes | 356/328 |
| 4,995,721 | 2/1991 | Krupa et al. | 356/328 |
| 5,231,461 | 7/1993 | Silvergate et al. | 356/328 |
| 5,231,462 | 7/1993 | Dschen | 356/328 |
| 5,329,353 | 7/1994 | Ichimura et al. | 356/328 |

*Primary Examiner*—K. Hantis
*Attorney, Agent, or Firm*—Handal & Morofsky

[57] ABSTRACT

A compact spectrum analyzer module suitable as a subsystem in optoelectronic instrumentation is disclosed which analyzer module employs two mirror surfaces to provide a folded optical path to and from a stock concave focusing diffraction grating. The module has mutually perpendicular input and output optical paths whereby input and output slits, or apertures, can be positioned on adjacent, mutually perpendicular faces of a box-like rectangular housing providing more convenience in the location of external system components such as light samplers and detector arrays, in many situations. Mirror orientation is effective to turn the output optical path through ninety degrees from the input path and to generate from polychromatic light a focused output spectrum in a plane parallel with the input path. Both the input path and the focused output spectrum lie, in preferred embodiments, in planes, not necessarily coincident, that are perpendicular to the optical axis of the grating.

22 Claims, 6 Drawing Sheets

COMPACT SPECTRUM ANALYZER MODULE

This application is a Continuation of application Ser. No. 08/002,597, filed Jan. 11, 1993, now abandoned.

TECHNICAL FIELD

The present invention relates to spectrum analyzers of the type which typically are modules incorporated as subsystems into larger instruments, and which function as monochromators or spectrographs.

BACKGROUND

In recent years, the trend of manufacturers to fabricate products using modular subsystems has created a need for small, light-weight, devices that are easy to incorporate in larger systems.

Generally, monochromators and spectrographs manufactured for incorporation as subsystems in larger instruments take the form of rectangular metal boxes with inlet slits and provision for, in the case of a monochromator, an outlet slit or, in the case of a spectrograph, a detector array. The inputs and outputs of these devices are typically placed at the ends of their optical paths. While both the inlet and the outlet of a device may be on the same side, they are usually placed on adjacent sides of the box containing the spectrograph.

In one class of spectrum analyzer, the device functions by inputting light through the input slit, causing it to fall upon a concave focusing diffraction grating. The concave focusing diffraction grating then causes the light to be reflected at different angles and to be focused at different positions dependant upon its wavelength. The light at one or more wavelengths, which is to be monitored is then collected by a detector device at the relevant position focus. The detector device generates a signal, either in real time or over extended periods, relating to the intensity of the light falling on it.

An advantage of a modular approach to optical subsystem manufacture is that it facilitates precise location and orientation of optical components in specialized engineering and manufacturing environments. For such applications, compactness is highly desirable.

One possible approach for a compact spectrograph system is the use of a so-called Littrow mounting. In the Littrow mounting, the input and output paths of the monochromator or spectrograph are both contained in a plane parallel to the grooves of the grating substantially perpendicular to the surface of the grating. The input and output paths are also configured to be substantially coincident with the central axis of the grating at a relatively small angle with respect to each other, so that the same optics may be used in both the collimation of light falling on the grating and the focusing of light leaving the grating. The use of the same optics in both the input and output paths has the advantage of substantially cancelling a significant portion of the aberrations associated with the system. In addition, there is an economy of space.

One approach for a compact modular analyzer is illustrated in U.S. Pat. No. 4,850,706 of Mikes. Here a concave focusing holographic diffraction grating is operated in near-Littrow configuration. In this device, the input light and an output spectrum are substantially in the same plane, a plane perpendicular to the grating and parallel to the grooves of the grating, and depart from the central axis by less than ten degrees. Compactness is achieved by folding the input and output light paths using a pair of mirrors which are substantially at right angles to each other and define an apex that faces the grating surface. Consequently, the light path extends from between opposite sides of the spectrum analyzer module. This is in contrast to the configuration of prior systems which evolved around perpendicular input and output paths. A drawback of a Littrow mounting is that it severely limits the grating designer's freedom to optimize system characteristics.

Another approach to a compact high quality spectrum analyzer module is disclosed in my earlier co-pending patent application, Ser. No. 07/960,091, U.S. Pat. No. 5,371,586 entitled Low Aberration Diffraction Grating System, filed Oct. 9, 1992. In this system, collimated light is input to the spectrograph and analyzed light is focused on a wall of the modular spectrum analyzer adjacent to the wall in which input light enters. The absence of collimating optics and the use of relatively customary grating geometry gives this system exceptional power, although there is a small compromise to be made in the area of system compactness.

SUMMARY OF THE INVENTION

The invention, as claimed, is intended to provide an improvement over existing spectrum analyzer subsystems. It solves the problem of how to provide a compact, spectrograph module having an economy of space not attainable with Littrow-type systems, yet providing for high quality imaging. The same is achieved using relatively conventional concave holographic gratings. Moreover, a thin system configuration is possible. In addition, light inputs and outputs can, in preferred embodiments, be at right angles to each other on adjacent sides of the spectrum analyzer module.

Broadly stated, these and other objectives are obtained according to the invention by providing a compact spectrum analyzer module, in which an optical path to and from a diffraction grating is folded by input and output mirrors, wherein the mirrors are independently mounted to permit physical separation of their planes of reflection of incident light, so that the planes are not coincident, enabling the output beam to be bent to a more convenient angle providing for compact mounting of external elements.

The diffraction grating should be concave to focus an output spectrum, and has an optical axis and grating lines extending generally perpendicularly to said optical axis. An inlet admits an input beam of light in a input direction to be analyzed on an inlet path substantially perpendicular to the optical axis of the diffraction grating, while a first input mirror is oriented at an angle to the optical path to reflect light toward the diffraction grating. A second, output mirror is positioned to intercept light dispersed by the diffraction grating and reflect the dispersed light along an output path to an output aperture for egress of reflected and diffracted light from the module. By means of the invention, the output path is in an outlet direction disposed, for a collimated monochromatic light ray at an acute angle of at least 28° to the input direction.

Thus the direction of the input path is at least 28° out of parallel or coincide with the direction of the output path. Preferably, the output path is perpendicular to the input path, the input mirror is adjacent the output mirror and the input mirror is positioned proximate to the inlet.

The output mirror can be elongated to accommodate a refracted spectrum of a range of wavelengths of light the elongation extending transversely of the input path.

The spectrum analyzer module of the invention can comprise a generally rectangular box-like housing containing the mirrors and the diffraction grating. Light is input at a right angle to an input face of the housing containing the input slit, and an array detector for detecting light is placed at a focal plane of the grating which is parallel to an output face of the housing. Preferably, for compactness, the output face is adjacent to, contiguous with and perpendicular to the input face of the housing.

The first and second mirrors can be independently mounted and the first mirror can be adjustable to select an input light wavelength range. Also, the second mirror can be adjustable to align the output spectrum.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
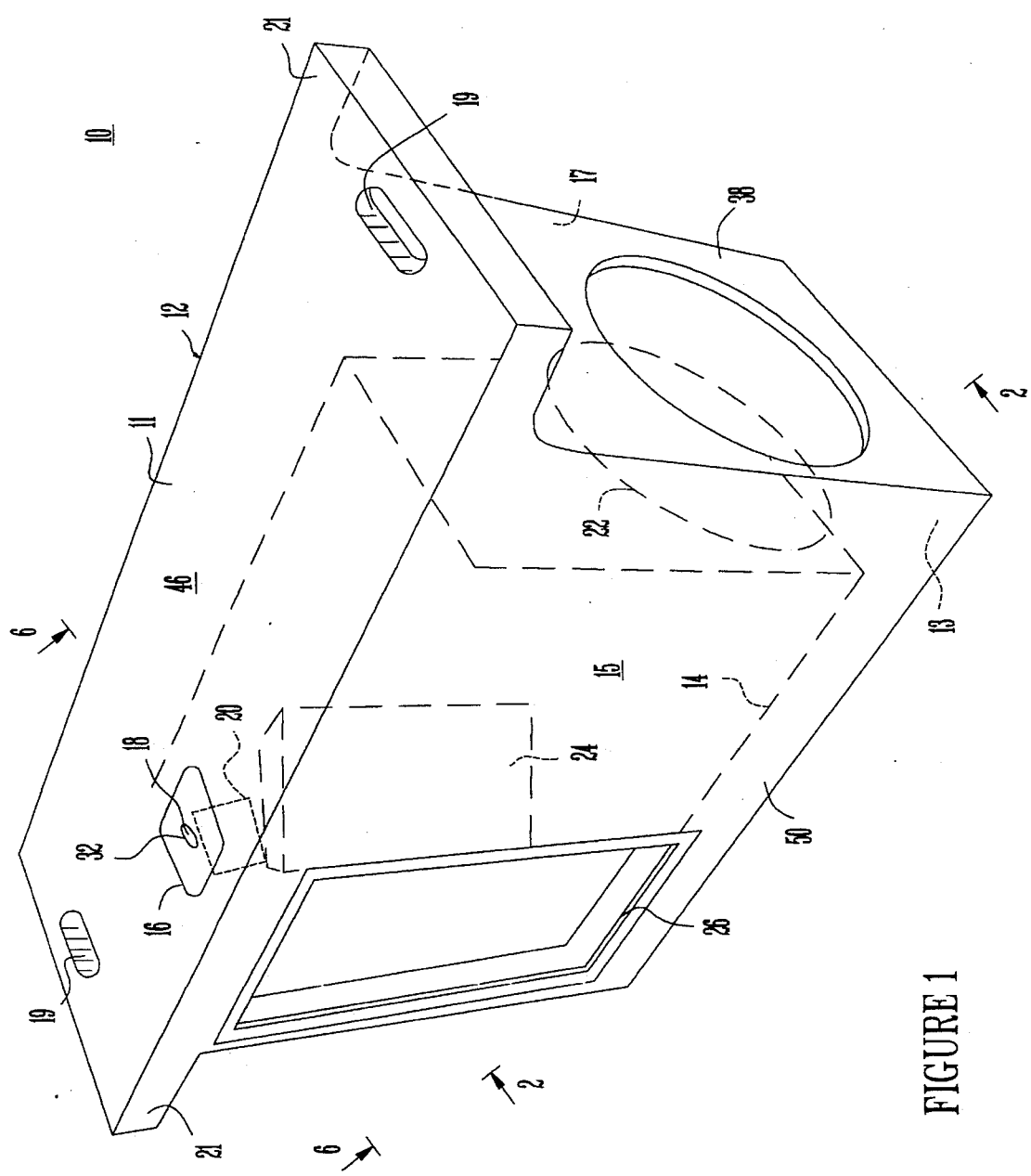
FIG. 1 is a perspective view of a spectrum analyzer constructed in accordance with one embodiment of the present invention.

Referring to FIG. 1, a spectrum analyzer constructed in accordance with the present invention is illustrated. The spectrum analyzer comprises a spectrograph module 10, having a housing 12 defining an internal cavity 14 which, in accordance with the present invention, is painted with a black, light-absorbing paint to minimize the effects of stray light. Housing 12 has upper and lower walls 11 and 13, respectively, between which extend front and rear side walls 15 and 17, respectively. Fixing holes 19 are provided in overlying end pieces of upper wall 21. Housing 12 has tipper and lower walls 11 and 13, respectively, between which extend front and rear side walls 15 and 17, respectively. Fixing holes 19 are provided in overlying end pieces 21 of tipper wall 13.

Housing 12 also comprises an inlet mask 16 which defines an aperture or slit 18, through which light input into the system passes on a path substantially perpendicular to the upper face of housing 12. Contained within cavity 14 is a mirror 20 for reflecting light input into the system.

Input light reflected from mirror 20 is analyzed by a spectrograph diffraction grating 22 the reflected beam from which is provided to an output mirror 24. Mirror 24 outputs light through a rectangular window 26 to the exterior of housing 12 where any suitable detector means, such as a charge-coupled device array (ccd array) may be located.

Figure 2:
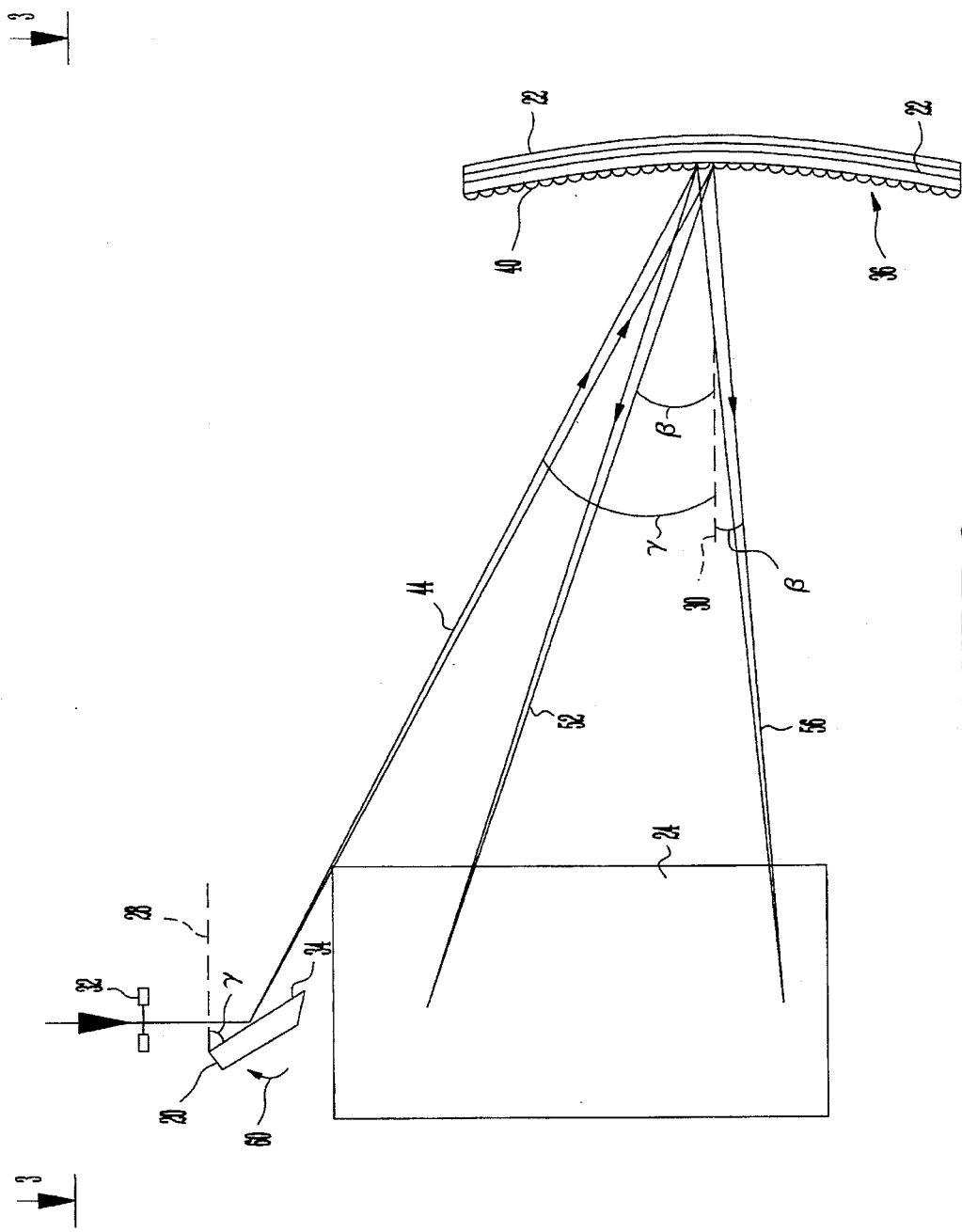
FIG. 2 is a side view in the direction of lines 2—2 of FIG. 1 schematically illustrating the optical system of the analyzer module of FIG. 1.

As can be seen in FIG. 2, mirror 20 is oriented at an angle γ of 59° with respect to line 28. Line 28 is parallel to the optical axis 30, passing through the center of grating 22 perpendicularly to the surface of the grating. Mirror 20, because of its proximity to inlet slit 18 is of relatively small size. Insofar as its function is to deflect the path of incoming radiation, mirror 20 is planar, having a flat reflective surface 34. Preferably, the orientation of mirror 20, and in particular the angle γ is adjustable to calibrate the analyzer module for different wavelengths or wavelength ranges.

Grating 22 is mounted in rectangular housing 12 with its reflective surface 36 (FIG. 2) substantially parallel to the end wall 38 of housing 12, in other words, with its optical axis 30, perpendicular to end wall 38 and also perpendicular to the light input path. Grating 22 is a concave focusing grating of conventional design intended for use as a spectrograph and generates a substantially planar spectrum. As shown, grating 22 is concavely spherically curved about two perpendicular axes and in the disclosed embodiment is spherical. However, the curvature may be aspherical, for example toroidal. In this case, one employs a toroidal grating of the type designed to produce a planar spectrum, for example, and fold the path, in the general directions and manner illustrated in the Figures.

Grating 22 has a groove density of 1150 grooves per millimeter and an operating range between 340 nm. to 690 nm. in wavelength. The diameter of the grating is 40 mm., and the grating has a concave radius of curvature of 88.102 mm. Such a grating is available from Instruments SA of Edison, N.J., under catalog number 523-00-570. The grooves 40 of grating 22 are oriented substantially parallel to the end wall 38 of housing 12, at their midpoints and extend substantially parallel to the upper and lower walls 11 and 13, respectively, of housing 12 between front and rear sidewalls 15 and 17, respectively, of the housing. Grooves 40 are also generally perpendicular to both direction 64 of the light input path 44 (see FIG. 6) and the optical axis 30 and, as will become apparent, are parallel with the inlet slit 18 and with direction 66 of a mean light output path, of output beam 62 (also see FIG. 6, for example of a ray of wavelength 520 nm.

Figure 3:
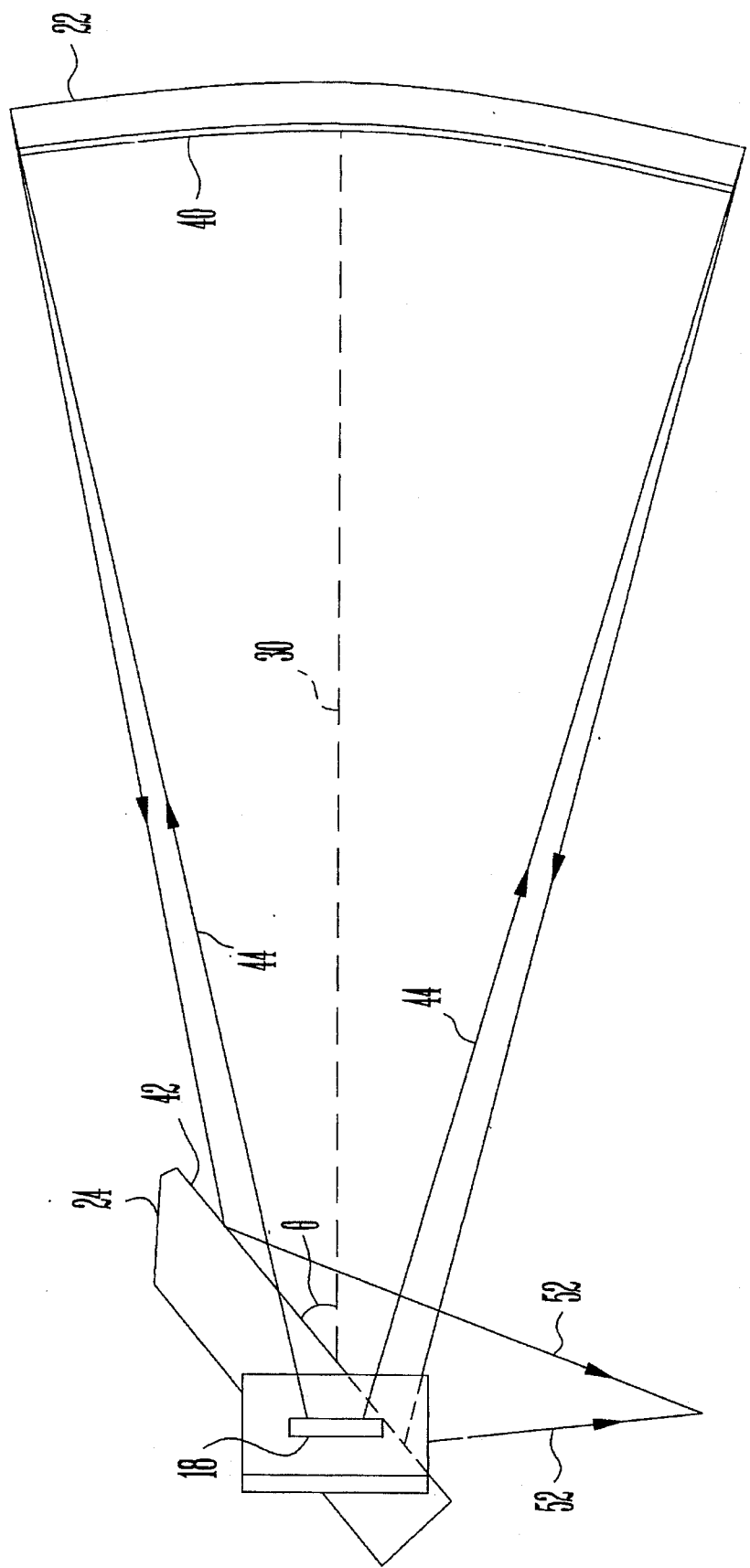
FIG. 3 is a plan view along lines 3—3 of the optical system of FIG. 2.

As illustrated most clearly in FIG. 3, output mirror 24 is oriented at an angle θ, with respect to optical axis 30, of 42.5°. Mirror 24 is also a planar mirror, having a reflective planar surface 42 and is relatively long in shape, in order to accommodate the focusing of a wide range of wavelengths. Preferably, mirror 24 is mounted to be angularly adjustable to align the output spectrum with a detector or detector array.

Figure 4:
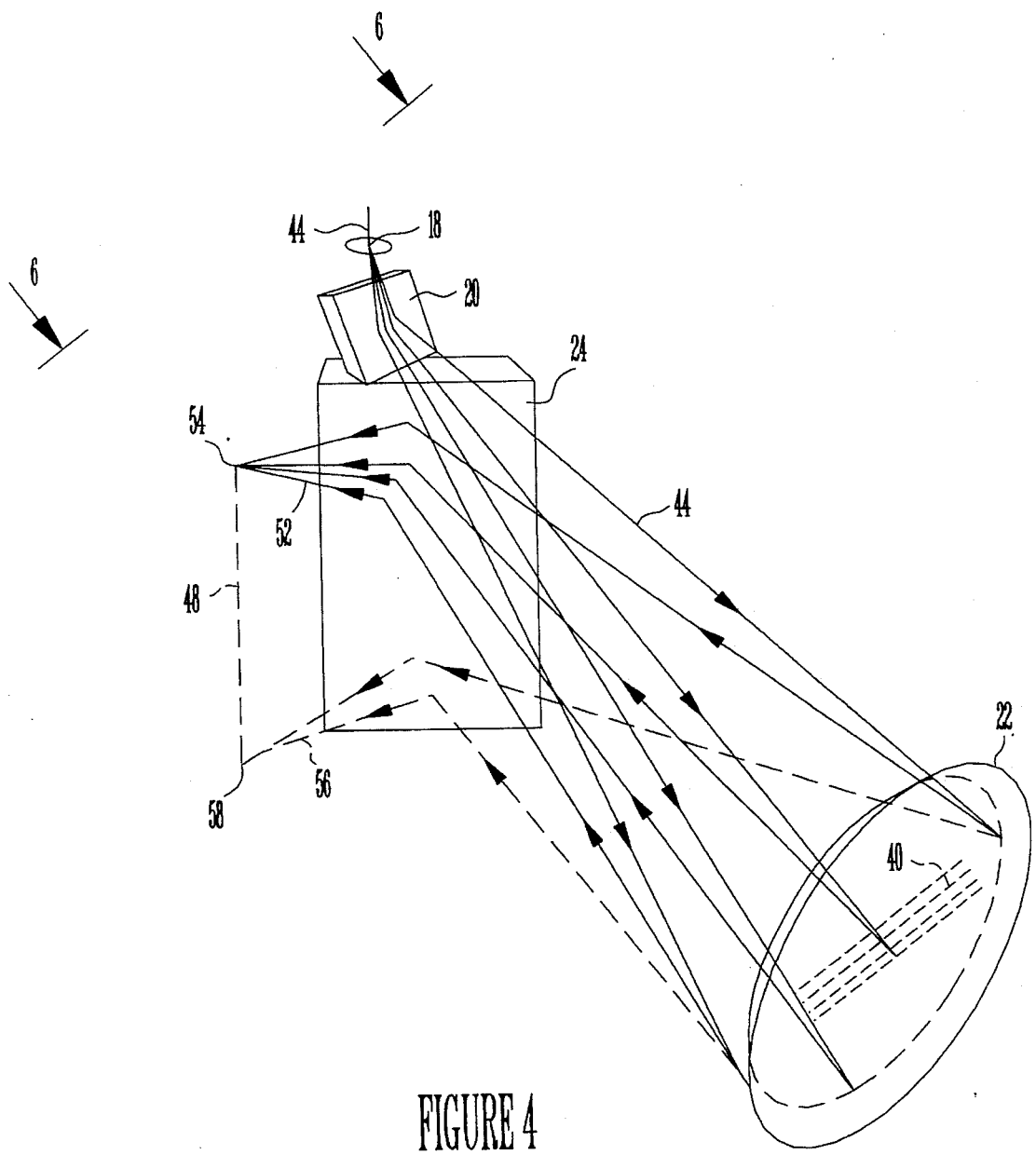
FIG. 4 is a perspective view similar to FIG. 1 in which only the optics of the system are illustrated, also schematically.

As best seen in FIG. 4, smaller, input mirror 20 can be positioned closely proximate or physically in contact with larger output mirror 24 and the two mirrors 20 and 24 can be positioned at one end of housing 12 opposite grating 22.

With the optical geometry shown, adjustments of the independently mounted mirrors 20 and 24 are usually adequate so that the grating 22 can be fixedly mounted in housing 12, an advantage where ease of manufacture and precision are important.

Figure 5:
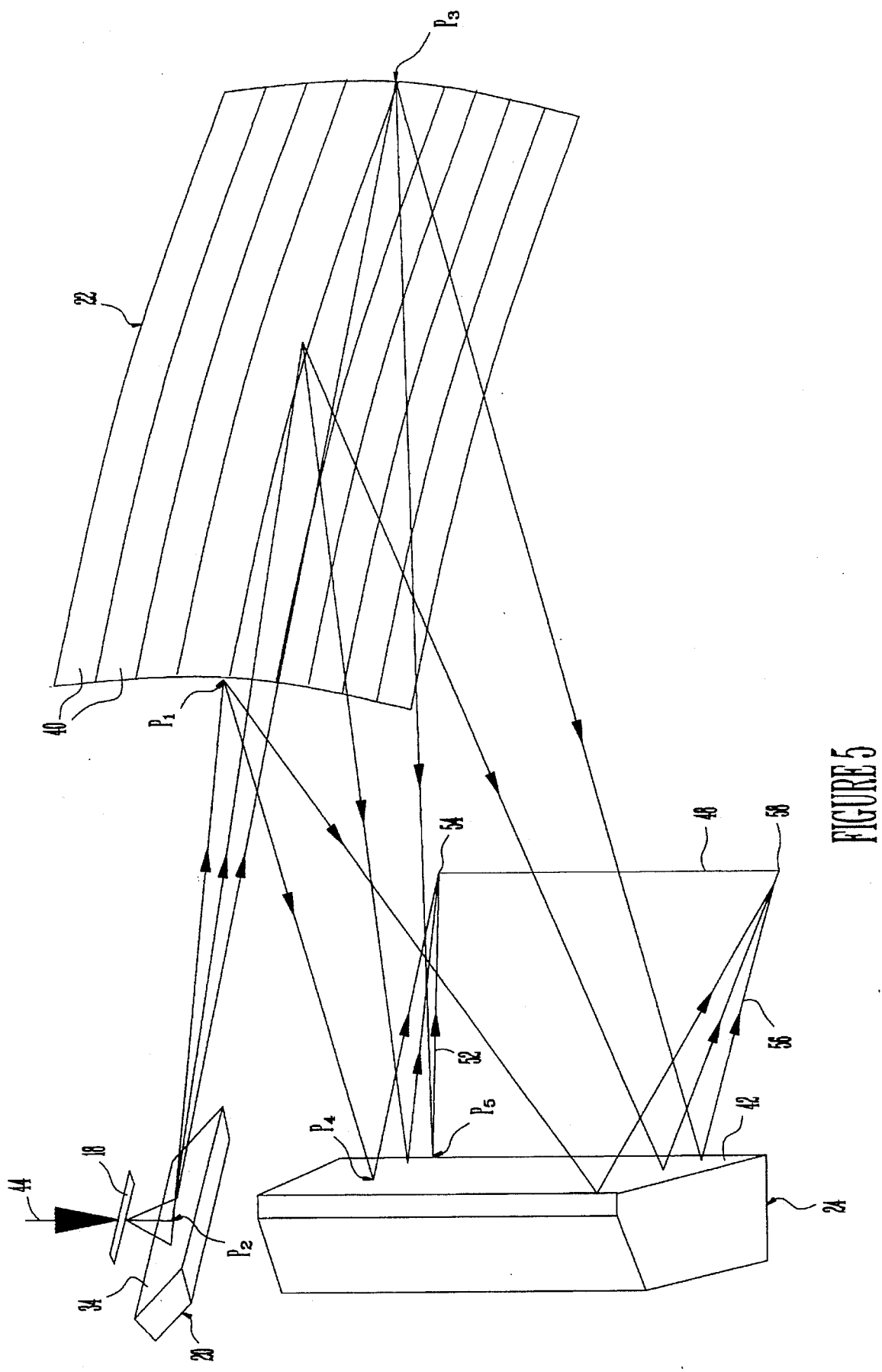
FIG. 5 is a perspective view similar to FIG. 4 schematically illustrating an alternative optical system of the spectrum analyzer constructed in accordance with the embodiment of FIG. 1.

The operation of the inventive system may be most easily understood in connection with FIGS. 4 and 5. An input beam of light 44 enters the instrument through slit 18 at an angle substantially perpendicular to the top surface 46 of housing 12. Input beam 44 is then reflected at the surface 34 of mirror 20 toward the grooves 40 of grating 22, defining a plane, if incidence with grating 22.

Because beam 44 enters at a right angle to top surface 46, and because housing 12 is rectangular in shape with all sides perpendicular to their adjacent sides, mounting of the unit is substantially simplified compared to many prior art monochromators which have light input at angles corresponding to the angles of use, typically on the order of 60° in contrast to the system of the preferred embodiment of the present invention. In this respect, the inventive system also represents an improvement over Littrow or near-Littrow type mountings with mirrors at their input and output requiring externally situated light input and detector devices to be substantially in line with one another, which can be undesirably bulky and inconvenient in complex instrumentation.

As can be seen most easily in FIG. 2, after reflection by mirror 20, beam 44 is caused to fall on grooves 40 at an incident angle γ of approximately 28°. After dispersion by the grating, light of the longest wavelength in the field of detection defined by the window 26, is reflected by the grating at an angle β of approximately 18°, while light of the shortest wavelength in the field of detection relatively short wavelength is reflected at an angle β, of approximately −5°, referring to FIG. 2

Turning again to FIGS. 4 and 5, light of varying wavelengths is generally focused on a focal surface 48 which, in the preferred embodiment is substantially straight and parallel to side 50 of housing 12, although it could be slightly curved about the optical axis 30, depending primarily upon the optical characteristics of the mirror 24 and the grating 22. Thus, rays 52 of light of longer wavelengths are focused at a position 54, while rays 56 of light of shorter wavelengths are focused at position 58. Alignment of the output spectrum at this location can be assisted, as mentioned above, by pivotal movement of mirror 24 about one or more axes in accordance with the known characteristics of the stock grating employed.

In accordance with the present invention, it is also possible to vary the range of wavelengths which are focused by the system. In particular, referring to FIG. 2, if mirror 20 is rotated in the direction indicated by arrow 60, the longest wavelength in the output field of the analyzer tends to increase, thus varying the range of the inventive spectrograph.

Referring to FIGS. 2–5, it will be apparent that for any given "ray" or monochromatic beam of light, each mirror 20 and 24 has its own plane of reflection, being a plane perpendicular to the surface of the mirror in which both the incident and reflected beams lie. Unlike Littrow and near-Littrow constructions in which the planes of reflection of the input and output mirrors, lying on adjacent faces of a symmetrically aligned prism, are substantially coincident, it is characteristic of this invention that the planes of reflection of the mirrors 20 and 24 are not in Littrow but instead subtend a substantial acute angle with one another for example, an angle in excess of 10°. This is apparent from FIG. 5, where the input planes of the grating 22 is defined by the points $P_1$, $P_2$, $P_3$, while a corresponding reflection planes are defined, for example, by the points $P_1$, $P_3$, $P_4$ or $P_1$, $P_3$, $P_5$. The angle subtended by such planes where they intersect will likely lie between 11° and 34° However, angles of greater magnitude are possible depending on grating characteristics.

Figure 6:
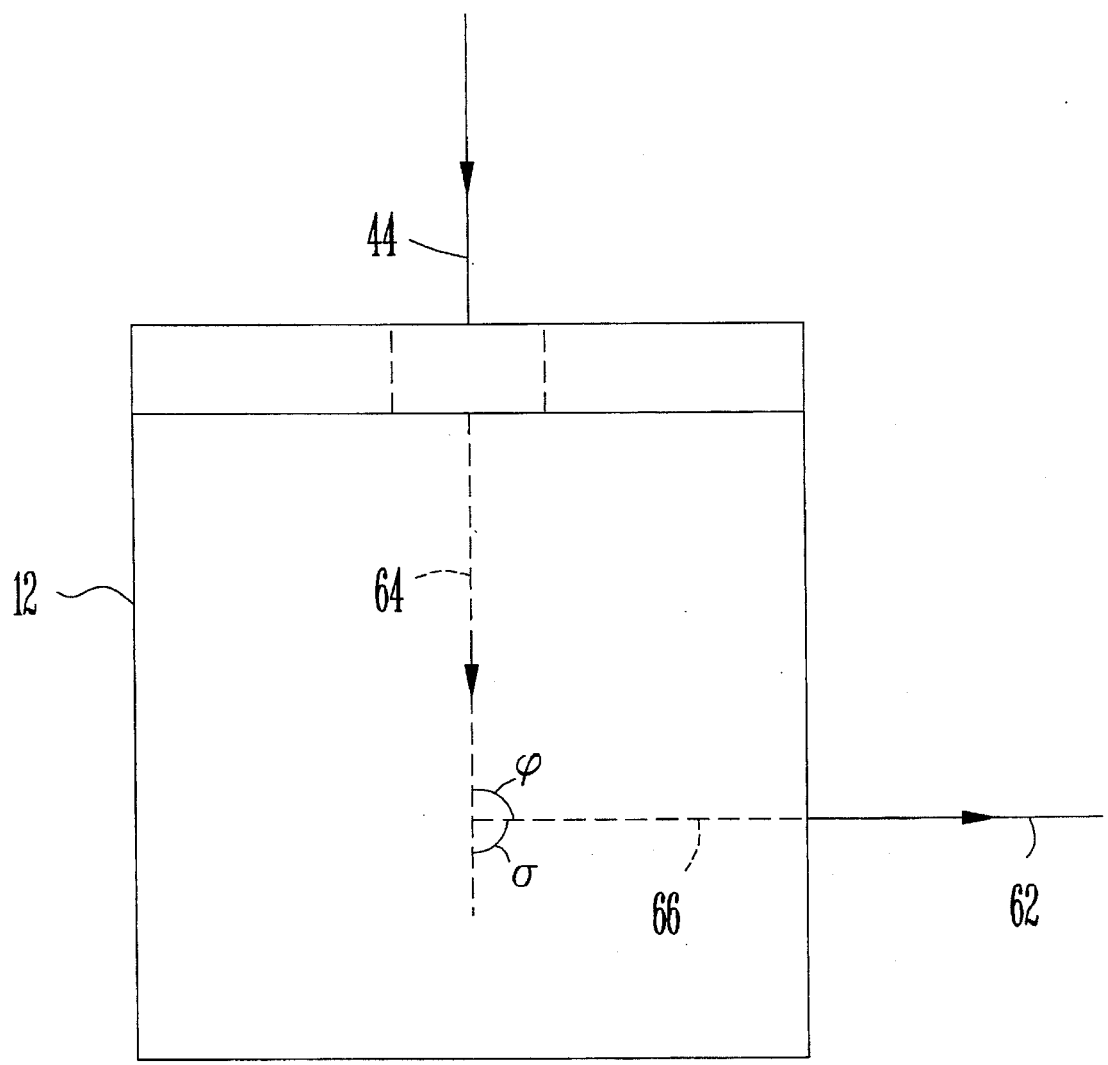
FIG. 6 is an end view of the spectrum analyzer of FIG. 1, in the direction of arrow 6.

The angular relationship between input beam 44 and a resultant output beam 62 can be clearly seen from FIG. 6. Input beam 44 travels along an input path in an input direction 64 and emerges as output beam 62 on an output path in an output direction 66. As viewed in the direction of FIG. 6, input direction 64 intersects output direction 66 at an acute angle φ or σ of at least 28°. In the preferred embodiment, θ=σ=90°, the directions are perpendicular.

While a preferred structure yielding an output light path in a direction generally perpendicular to that of the input path has been described and illustrated, it will be apparent that advantages of convenience and compactness in a host optoelectronic system can be obtained by other designs of the inventive analyzer module in which the output path is emerges in a direction at a lesser angle, for example an acute angle in excess of 28°. Also, the flexible optical geometry of the invention permits variations in the positioning of inlet slit 18 and window 26. For example, they can be at different distances from the grating 22, referring to the length of the housing 12.

The inventive analyzer module is readily flush mounted or otherwise attached to such host optoelectronic system which can constitute, for example, scientific or other instrumentation. For this purpose, the housing 12 is provided on its flat top surface 46 sturdy side flanges 62 having mounting holes 64, the arrangement providing an alignable precision mounting. When mounted a light guide, light sampler or other light source cooperates with and outputs to the input slit 18 of the inventive analyzer module. An electronic detector or detector array can be mounted to read the spectrum output from window 26 with good physical separation from the optical system without imposing bulk in the direction of light input to the housing 12. The invention thus makes possible, and accordingly embraces more compact designs of sensitive precision optoelectronic systems than have heretofore been possible.

While preferred embodiments of the invention in the form of a spectrum analyzer, spectrograph or spectrometer have been described and illustrated, it will be apparent that the inventive module can readily be operated as, or adapted to be a monochromator by tuning it to the desired wavelength and outputting through a slit to a single detector, or providing other detector means suitable for monochromatic intensity determinations, as is known in the art.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A compact spectrum analyzer module, comprising:

a) a concave diffraction grating having an optical axis and having grating grooves extending generally perpendicularly to said optical axis;

b) an inlet for admitting an input beam of light to be analyzed along an input path in an input direction generally transverse to said optical axis and to said grating grooves;

c) an input mirror oriented at an angle to said input path to reflect said input beam toward said diffraction grating, said light beam traveling from said input mirror to said diffraction grating in a plane of incidence to said diffraction grating said plane of incidence passing through said optical axis of the diffraction grating transversely of said grooves;

d) output mirror positioned to intercept light dispersed by said diffraction grating and reflect said dispersed light in an output direction; and e) an output aperture for egress of light from said module; wherein said output direction is transverse to said plane of incidence to said diffraction grating and said input direction and said output direction is rotated about said diffraction grating optical axis through an acute angle of at least 28°, or through a right angle, to said input direction.

2. A spectrum analyzer module as in claim 1, wherein said input mirror is adjacent said output mirror.

3. A spectrum analyzer module as in claim 1, wherein said input mirror is positioned proximate to said inlet.

4. A spectrum analyzer module as in claim 1, wherein said inlet comprises a slit extending substantially parallel to said diffraction grating grooves and said output mirror is elongated to accommodate and reflect a dispersed spectrum of a range of wavelengths of light said elongation extending transversely of said grating grooves.

5. A spectrum analyzer module as in claim 1, wherein said input path from said input mirror to said diffraction grating is substantially parallel to a focal axis for light from a polychromatic input beam focused by said grating.

6. A spectrum analyzer module as in claim 1, comprising a generally rectangular box-like housing containing said mirrors and said diffraction grating, wherein light is input transversely to an input face of said housing, said input face containing said input slit, and wherein said output direction is through an output face of said housing, said output face being adjacent to and perpendicular to said input face of said housing.

7. A spectrum analyzer module as in claim 6, wherein said input and output mirrors are independently mounted and said first mirror is adjustable to select an input light wavelength range.

8. A compact spectrum analyzer module according to claim 6 wherein said diffraction grating is fixedly mounted in said housing and said grating grooves are oriented substantially parallel to said input face.

9. A spectrum analyzer module as in claim 8, wherein said input and output mirrors are independently mounted and said output mirror is adjustable to align the output spectrum.

10. A compact spectrum analyzer module according to claim 6 having a ray detector for detecting light placed at a focal plane of said grating said focal plane being parallel to said output face of the housing.

11. A compact spectrum analyzer module according to claim 1 having a non-Littrow light path through the analyzer and wherein said diffraction grating produces a planar spectrum from a polychromatic input beam, said diffraction grating dispersing a polychromatic input beam into a substantially planar spectral output.

12. A spectrum analyzer module as in claim 1, wherein said input mirror has a first reflection plane, said first plane of reflection being defined by a respective path of incidence on said input mirror and a respective path of reflection from said input mirror defined by the path followed by a monochromatic input light beam, said output mirror has a second plane of reflection defined by a respective path of incidence onto said output mirror and a respective path of reflection from said output mirror for a monochromatic beam and said planes of reflection intersect at an angle in excess of 10°.

13. An optoelectronic system, comprising a spectrum analyzer module as in claim 1, a housing for said analyzer module, a light guide device adjacent to said inlet to supply a light sample thereto, and an electronic light detector adjacent said output aperture to receive said light output.

14. A compact spectrum analyzer module having a housing, and mirrors and a grating supported within said housing, said mirrors and said grating being positioned to reflect light input at one angle to said housing and output light at another angle for detection, said module, comprising:

(a) a housing;

(b) a concave diffraction grating supported within said housing, said grating having an optical axis and having grating grooves extending generally transversely to said optical axis;

(c) an inlet on said housing for admitting an input beam of light to be analyzed along an input path transverse to said optical axis and to said grating grooves;

(d) a first input mirror mounted within said housing proximate to said inlet for reflecting light admitted by said inlet toward said diffraction grating, said first mirror being oriented at an angle to said optical path to reflect light toward said diffraction grating and having a first plane of reflection said first plane of reflection being defined by a respective path of incidence on said first mirror and a respective path of reflection from said first mirror and being defined by the path followed by a monochromatic input ray of light;

(e) a second output mirror mounted within said housing adjacent to said first mirror and positioned to intercept light dispersed from said diffraction grating, said second mirror being oriented to reflect said intercepted light along an output path transverse to said input path, having a second plane of reflection defined by a respective path of incidence onto said second mirror and a respective path of reflection from said second mirror for said monochromatic beam, said first and second planes of reflection being non-coincident and intersecting at an angle in excess of 10°, and said output mirror being elongated to accommodate a diffracted spectrum of a polychromatic light input beam, said elongation extending transversely of said output path; and (f) an output aperture for egress of light reflected by said second mirror from said module along an output path transverse to said diffraction grating optical axis and transverse to said plane of reflection of said first mirror.

15. A spectrum analyzer module as in claim 4 comprising a ray detector for detecting light placed at a focal plane of said grating wherein said ray detector is parallel to an output side of said housing and said output side is perpendicular to an input side at which light enters said grating.

16. A compact spectrum analyzer module as in claim 14, wherein said inlet and said output aperture are located on respective faces of said housing, said faces being positioned substantially as right angles to each other.

17. A compact spectrum analyzer module as in claim 14, wherein said grating grooves extending in a direction transverse to said input path and substantially in the same direction as said output path.

18. A compact spectrum analyzer module as in claim 17, wherein said second mirror is elongated to accommodate a diffracted spectrum of a white light input beam, said elongation extending transversely of said output path to define a substantially linear focal surface which extends in the same general direction as said input path.

19. A compact spectrum analyzer module, comprising:

a) a concave diffraction grating having an optical axis and having grating grooves extending generally perpendicularly to said optical axis;

b) an inlet for admitting an input beam of light to be analyzed on an input path in an input direction generally transverse to said optical axis and said grating grooves;

c) a first input mirror oriented at an angle to said optical path to reflect light toward said diffraction grating, said light beam travelling from said first input mirror to said diffraction grating in a plane of incidence to said diffraction grating passing through said optical axis transversely of said said grating grooves;

d) a second output mirror positioned to intercept light dispersed by said diffraction grating and reflect said dispersed light along an output path; and e) an output aperture for egress of light from said module; wherein said output path has an output direction oriented transversely to said input path direction and transversely to said plane of incidence to said diffraction grating.

20. A spectrum analyzer module as in claim 19 wherein said input direction is at an angle of between −5° and 18° with to the optical axis of the grating.

21. A spectrum analyzer module as in claim 19 wherein said input mirror is adjacent said output mirror and is relatively small in dimension as compared to said output mirror which is of small dimension in one direction and elongated in the other direction.

22. A spectrum analyzer module as in claim 19, wherein said second mirror is elongated to accommodate a diffracted spectrum of a white light input beam, said elongation extending transversely of said output path.

* * * * *